(12) United States Patent
Wu et al.

(10) Patent No.: US 8,005,109 B2
(45) Date of Patent: Aug. 23, 2011

(54) METHOD AND NETWORK APPARATUS FOR ADJUSTING COMMUNICATION RESOURCES WITHIN A COMMUNITY

(75) Inventors: Xuyong Wu, Shanzhen (CN); Zhong Pan, Shenzhen (CN); Quanbo Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 723 days.

(21) Appl. No.: 12/114,206

(22) Filed: May 2, 2008

(65) Prior Publication Data

US 2008/0198798 A1 Aug. 21, 2008

Related U.S. Application Data

(63) Continuation of application No. PCT/CN2006/002577, filed on Sep. 29, 2006.

(30) Foreign Application Priority Data

Nov. 4, 2005 (CN) .......................... 2005 1 0115542

(51) Int. Cl.
*H04J 3/16* (2006.01)
(52) U.S. Cl. ..................... 370/437; 370/328; 370/329
(58) Field of Classification Search .................. 370/310, 370/328, 329, 330, 431, 436, 437
See application file for complete search history.

(56) References Cited

U.S. PATENT DOCUMENTS

| | | | |
|---|---|---|---|
| 6,141,565 A | 10/2000 | Feuerstein et al. | |
| 6,272,348 B1 | 8/2001 | Saario et al. | |
| 6,597,671 B1 * | 7/2003 | Ahmadi et al. | 370/329 |
| 2004/0157613 A1 | 8/2004 | Steer et al. | |
| 2004/0248578 A1 | 12/2004 | Korpela et al. | |
| 2005/0141453 A1 * | 6/2005 | Zhu | 370/331 |

FOREIGN PATENT DOCUMENTS

| | | |
|---|---|---|
| CN | 1253704 | 5/2000 |
| WO | 9607284 A | 3/1996 |
| WO | WO-9852377 | 11/1998 |
| WO | 2005064968 A | 7/2005 |

OTHER PUBLICATIONS

International Search Report for International Application No. PCT/CN2006/002577, dated Jan. 21, 2007, with English translation.
European Search Report regarding Application No. 06791163.6 dated Feb. 3, 2009.

* cited by examiner

*Primary Examiner* — Chi Pham
*Assistant Examiner* — Weibin Huang
(74) *Attorney, Agent, or Firm* — Harness, Dickey & Pierce, P.L.C.

(57) ABSTRACT

A method and a network apparatus for adjusting communication resources in a community are disclosed. When the topological structure of the community changes, e.g., when new base station joins or exits, and when the community combines or splits, each base station re-allocates the communication resources by using a uniform algorithm, or the server or one base station in the community re-allocates the communication resources uniformly, then the base stations in the community are adjusted to the their own available resource at the same time based on the re-allocation results. The communication resources includes not only the frequency spectrum, but also those are exclusively occupied by a base station required by its normal operation, e.g., time slot, CDMA code word, sub-channel etc. With the present disclosure, the automatic optimum allocation and adjustment of the communication resources in a community could be realized.

17 Claims, 11 Drawing Sheets

METHOD AND NETWORK APPARATUS FOR ADJUSTING COMMUNICATION RESOURCES WITHIN A COMMUNITY

CROSS-REFERENCE TO RELATED APPLICATIONS

This application is a continuation of International Application No. PCT/CN2006/002577, filed Sep. 29, 2006. This application claims the benefit of Chinese Application No. 200510115542.4, filed Nov. 4, 2005. The disclosures of the above applications are incorporated herein by reference.

FIELD

The present disclosure relates to communication technologies and in particular to a method and a network for allocating communication resources within a community.

BACKGROUND

The statements in this section merely provide background information related to the present disclosure and may not constitute prior art.

Wideband wireless access technologies are currently under flourishing development, and the technologies of using wireless resources for wideband metropolitan area access are of vitality and enjoy a market share. The wireless spectrum resources are rather precious, and especially in a region that has not been planned well or a License-Exempt Band (LE Band), it tends to be required that a plurality of base stations operate over the same channel, which may result in mutual interference within a system to which they belong. In order to accommodate coexistence of respective devices, particularly LE Band devices, or devices experiencing no network frequency planning, under the same frequency band, there is a need for establishing a coexistence mechanism between the devices.

Neighbor Base Stations (Neighbor BSs) as used in the context refer to base stations sharing a common coverage area in which there is an active terminal. As illustrated in FIG. 1, an asterisk indicates a location where an active terminal is positioned. Although BS1 and BS 2 are geographically close to each other, and one is within a coverage area of the other and vice versa, they are not neighbor base stations because there is no terminal within their common coverage area, thus resulting in no serious interference to wireless network of the opposite party. Although BS2 and BS3 have a small overlapping area, and neither of them is within a coverage area of the other, they are called neighbor base stations in the context because there is an active terminal within the overlapping coverage area, thus resulting in interference to the wireless network of the opposite party.

A community as used in the context refers to a set of base stations in the same environment, and a subset consisted of any one or some of the base stations within the community shares a common coverage area with at least one base station which is within the community but does not belong to the subset. As illustrated in FIG. 2, BS1, BS2, BS3, and BS 4 together constitute a community C1. BS5 and BS3 have an overlapping coverage area in which there is no active terminal, so BS5 does not belong to the community C1, but constitutes solely a community C2. BS6 and BS7 do not belong to the community C1, and constitute another community C3.

A neighbor relationship table can represent a complete record of neighbor relationships within a community, showing whether each base station is a neighbor of another base station, and thus can reflect a network topology of the community. Rows and columns of the table are ordered identically, for instance, they are both arranged according to a descending sequence of numbers of neighbor base stations. Values in the neighbor relationship table constitute a symmetric matrix, and for each element, the value of 0 indicates that two base stations in the corresponding row and column are not neighbor base stations, and the value of 1 indicates that the corresponding two base stations are neighbor base stations. Table 1 illustrates an example of the neighbor relationship table, and the numbers of neighbor base stations of the respective base stations BS1, BS2 . . . are decremented in order.

TABLE 1

| Neighbor Relationship Table | | | | |
|---|---|---|---|---|
| BS ID | BS1 | BS2 | ... | BSn |
| BS1 | 1 | 0/1 | ... | 0/1 |
| BS2 | 0/1 | 1 | ... | 0/1 |
| ... | ... | ... | ... | ... |
| BSn | 0/1 | 0/1 | ... | 1 |

All base stations within a community share the same limited spectrum resource. For any base station being a member of the community, its operating frequency cannot be selected arbitrarily, and shall be planed as a whole, especially in the case of a large scale community. This relates to whether the spectrum resource can be utilized efficiently and fully, and further influences performances of the base stations and the community.

In various existing network planning methods, a static frequency configuration is employed for base stations, so that a maximum number of base stations in a community can operate in different frequency bands. Such a method supports no dynamic configuration, and thus it is difficult for carriers to cooperate with each other. Upon any change of a network, base stations can not tune or negotiate automatically, and the network has to be re-planned, thus resulting in a low efficiency.

SUMMARY

The present disclosure provides a method and a network device for allocating a communication resource within a community, which can address the problems of a low resource utilization ratio and inflexible resource configuration of those methods for fixed allocation of a communication resource in the prior art.

The present disclosure provides a method for allocating a network resource within a community including at least two base stations, including the steps of:

updating a neighbor relationship table of the community when a structure of the community is changed;

reallocating target communication resource used by each of the base stations according to the updated neighbor relationship table; and switching, by each of the base stations within the community, respective communication resource to the reallocated communication resources at a same switching time.

In various embodiments, one of the base stations within the community or a server of the community updates the neighbor relationship table of the community when the community topology is changed, and transmits the updated neighbor relationship table to all other base stations within the community; and all the base stations within the community use the same algorithm to reallocate the target communication resources according to the updated neighbor relationship table.

In various embodiments, one of the base stations within the community or a server of the community updates the neighbor relationship table of the community when the community topology is changed, and reallocates collectively the target communication resource for each base station within the community according to the updated neighbor relationship table; and the server of the community or the base station which performs resource reallocation informs each base station within the community of an allocation result.

Further, the one of the base stations within the community or the server of the community transmits transmission timing information to each of the base stations while transmitting the neighbor relationship table or the allocation result of the target communication resources, and each of the base stations determines the same switching time according to the received timing information.

The transmission timing information is a frame serial-number at the transmission time, and the same switching time is a time of the frame serial-number delayed by a preset number of frame periods.

In the method, the server of the community, which updates the neighbor relationship table of the community when the community topology is changed, updates the neighbor relationship table of the community according to the information reported by a base station at a location of the change of the community.

The base station at a location of the change of the community also reports community topology change time information when and the server of the community records the community topology change time information.

In the method, the base station, which updates the neighbor relationship table of the community when the community topology is changed, is a base station at a location of the change of the community.

The base station at a location of the change of the community updates a local neighbor relationship table according to a neighbor relationship table of a neighbor base station, and records the community topology change time information.

In the method, acquiring, by each base station within the community, the updated neighbor relationship table of the community and the community topology change time information includes:

updating, by the server of the community or the base station at a location of the change of the community, the neighbor relationship table of the community and community topology change time information, and then transmitting the updated neighbor relationship table of the community and the timing information to other base stations within the community; and updating, by the other base stations within the community, their neighbor relationship tables of the community according to the received neighbor relationship table, and storing the community topology change time information; or updating, by the server of the community or the base station at a location of the change of the community, the neighbor relationship table of the community and the community topology change time information, and then transmitting the updated neighbor relationship table of the community and community topology change time information to a neighbor base stations; and broadcasting, by the neighbor base station, in a level-by-level way, the updated neighbor relationship table of the community and community topology change time information to all the base stations within the community dependent upon neighbor relationships.

The community topology change time information is a frame serial-number within the community or an absolute time synchronized within the community.

Further, the base station within the community delay introduces a delay of a preset threshold to the time when the community topology changes to obtain the adjust time. The preset threshold is a number of frames within the community or an absolute time span.

In the method, the base station at a location of the change of the community at least includes: a newly added base station within the community, a neighbor base station of the newly added base station, a base station to be powered off, a neighbor base station of the base station to be powered off, a base station with a voluntary change of resource configuration, a neighbor base station of the base station with a voluntary change of resource configuration, a base station with a coverage area change and its neighbor base station, a newly neighbor station due to a terminal being newly initiated within the community.

Moreover, when a new base station is added within the community, the method further includes: synchronizing, by the newly added base station, upon joining the community, frame timing and the frame serial-number to a neighbor base station.

In the method, the communication resource includes a frequency, a time, a code word in a CDMA system, or a sub-channel in an OFDM/OFDMA system, used by each of the base stations; and/or an algorithm for communication resource reallocation includes a greedy algorithm.

The present disclosure also provides a network device including a transceiver module, and the network device further includes an update module, a storage module, and a processing module.

The update module between the transceiver module and the storage module updates a neighbor relationship table stored in the storage module according to information on a change of a community received from another network entity and/or perceived by the update module or updates a received neighbor relationship table of the community into the storage module.

The processing module is connected with the storage module, reallocates a communication resource and determines a switching time according to the updated neighbor relationship table.

Further, the network device further includes a notification module between the transceiver module and the processing module, which generates a notification message including information on a resource allocation result and a switching time, or a notification message including the neighbor relationship table of the community, and transmits the notification message to other network devices within the community through the transceiver module.

Further, the network device further includes a switch module connected with the processing module, which switches a present base station with respect to a corresponding target resource at a switching time.

The solutions of the present disclosure can provide the following advantageous effects:

1. The present disclosure provides a method and a network device for automatic allocation of a communication resource, so that the communication resource can be allocated automatically and coordinately between coexisting base stations, and thus optimized allocation and utilization of the resource can be improved.

2. With the solutions of the present disclosure, in the case that a community is changed, the changed community can achieve automatic allocation of a communication resource, so as to maximize a system capacity with a minimized amount of the resource.

3. Because a community in the solution of the present disclosure involves a set of coexisting base stations in existing various communication systems, and the method of the present disclosure can be applied to allocate most of existing communication resources, including a frequency, a time, a code word in a CDMA system, a sub-channel in an OFDM/OFDMA system, etc, as used by a base station, the present disclosure provides a versatile method for optimized resource allocation.

4. Moreover, the solutions of the present disclosure can allow a fully dynamic and automatic implementation without manual configuration, and thus the maintenance can be simple, and requirements on network planning prior to network building can be lowered.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides a method for dynamic allocation of an available communication resource dependent upon a structure change of a community. When a new base station joins a community or a base station quits a community, or when communities are merged or a community is split, the topology or topologies of the community or communities are changed, which will pose an inevitable influence upon an arrangement of a communication resource within a community. In this regard, the communication resource can be reallocated within the community, and an available communication resource will be allocated for a newly joining member.

A communication resource as referred to in the present disclosure is a generalized concept, which means a spectrum or any other exclusive resource necessary for normal operation of a base station, such as a time slot, a CDMA code word, a sub-channel, etc. Moreover, a combination of various resources can be a new resource form. The nature of coexistence in a community requires that all member base stations share various resources without mutual interference. Some resources are not scarce with an amount greater than the number of the members in the community. While some resources are not enough for the community, and these resources have to be shared and reused among bases stations which are not adjacent within the community.

No description will be presented in the present disclosure for a case where neighbor base stations, e.g., two neighbor base stations, are allowed to use the same resource. Actually, only terminals located within a common coverage area confront an interference issue with respect to the same resource interference. However, terminals located out of the common coverage area will not interfere, even if the base stations use the same spectrum resource or other resource.

Figure 1:
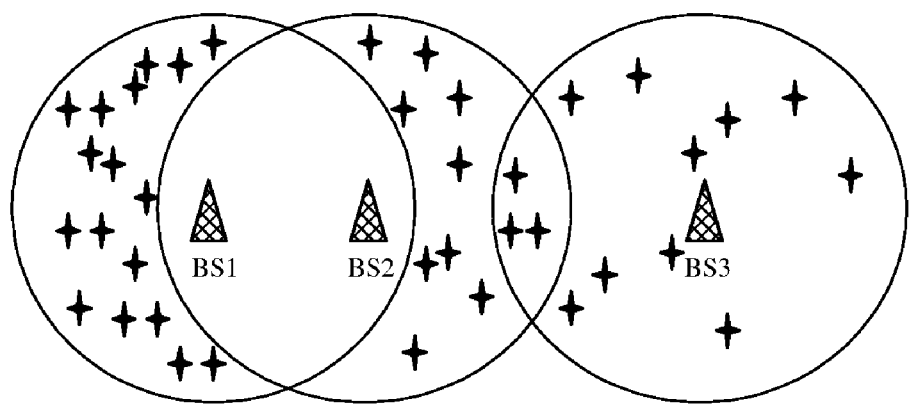
FIG. 1 is a schematic diagram of a concept of neighbor base station.
Figure 2:
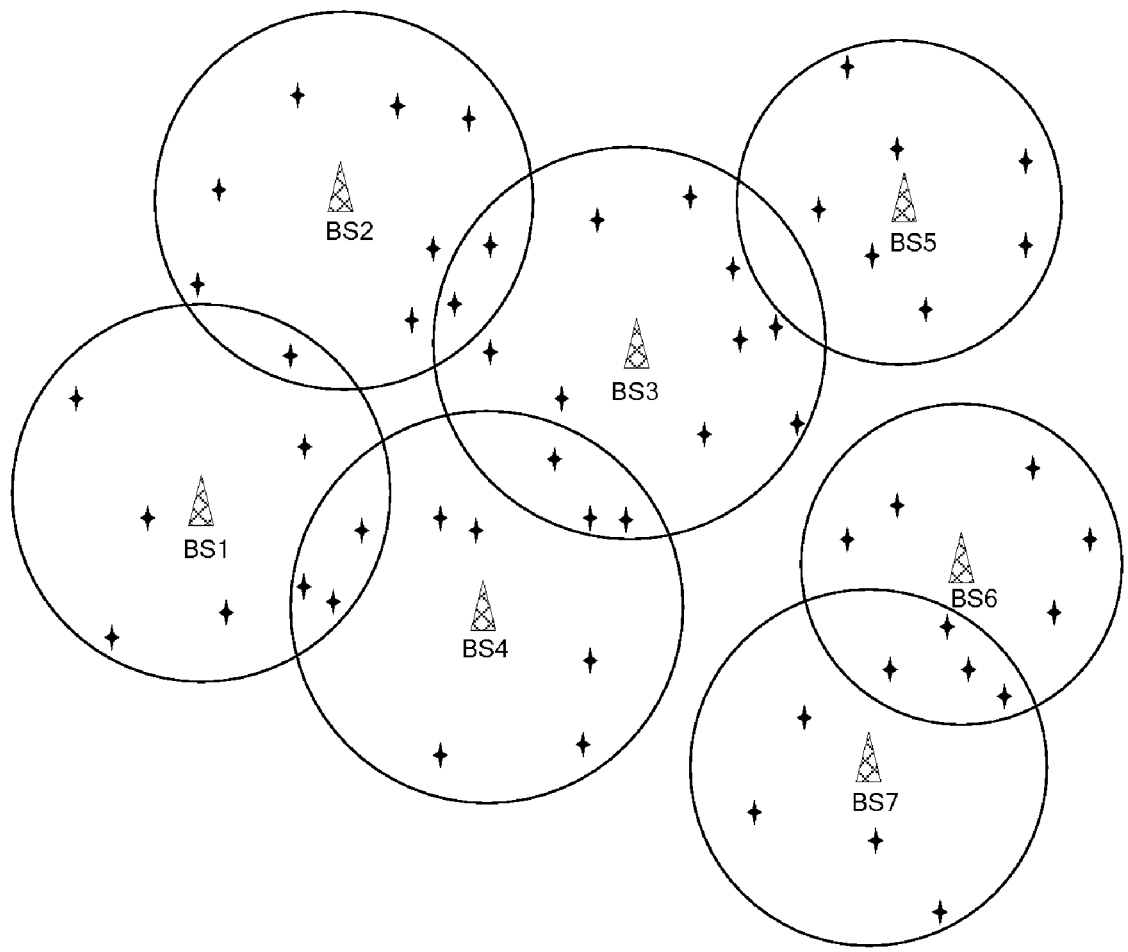
FIG. 2 is a schematic diagram of a concept of community.
Figure 3:
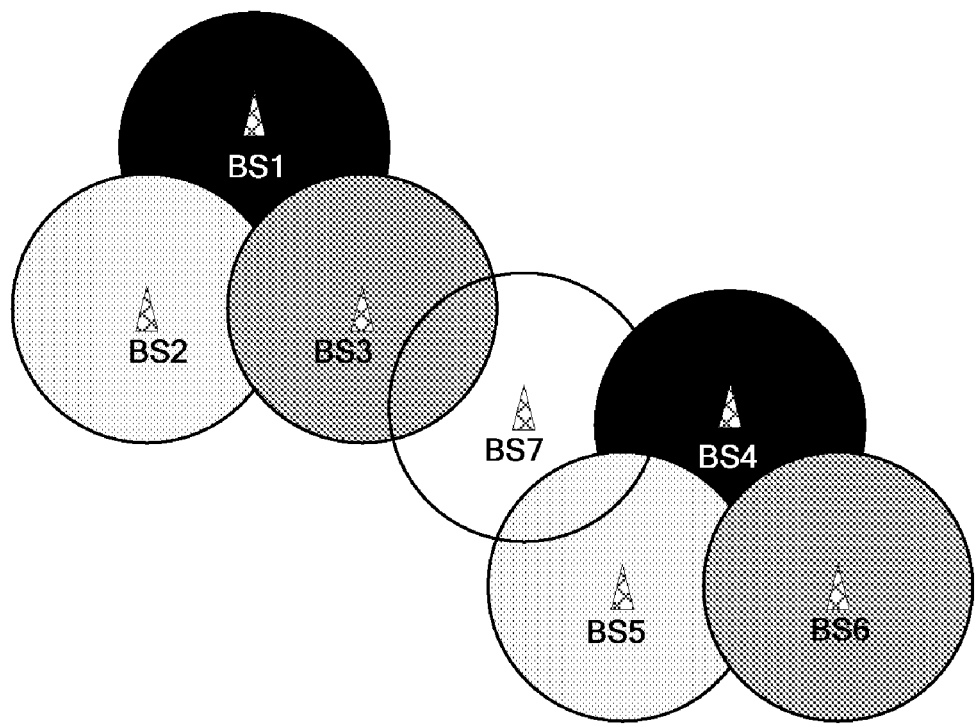
FIG. 3 and FIG. 4 are schematic diagrams of a principle of a method according to the present disclosure.

Referring to FIG. 3, assume that overlapping base stations are neighbor base stations to each other, and if they operate on the same frequency, there will be interference. For this reason, they are required to operate on different frequencies. In the figure, BS1~BS6 denote base stations which are operating normally, and belong to two different communities respectively. Assume that there are only three frequencies available in a region where the two communities are located, and an area of each frequency is represented with a different background color. Also assume that allocation of the three frequencies within the two communities is as illustrated in FIG. 3. If a new base station BS7 is initiated at a location as illustrated, the two communities will merge into one community. However, since the three neighbor base stations BS3, BS4, and BS5 of BS7 have already occupied all the frequencies, an additional frequency shall be provided if it is required that there is no interference between BS7 and the neighbor base stations.

Figure 4:
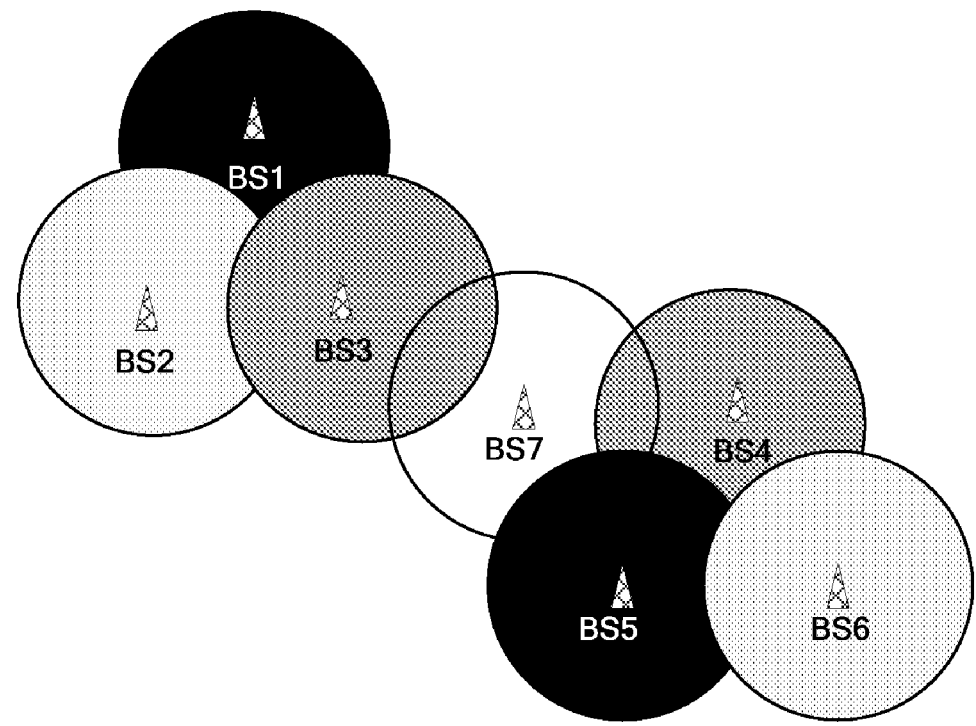

Referring to FIG. 4, if the frequencies are allocated among BS1~BS6 in an arrangement as illustrated, it can be ensured that the original base stations in the two communities share the same frequencies without interference. One of the existing frequencies can be allocated for the newly joining base station BS7. Of course, one of frequencies used in an area with another background color can be allocated for BS7 in an alternative frequency allocation.

Similarly, this also applies to allocation of other kinds of communication resources. As can be seen, an amount of a communication resource required will vary with the allocation of the resource within a community. Therefore, upon expansion of the community, an arrangement for allocation of the communication resource can be regulated to reduce a demand of the community for the amount of the communication resource.

An idea of the present disclosure lies in that upon a change of a community, a communication resource as used by each base station can be reallocated dependent upon updated neighbor relationships in the community for the purpose of optimized allocation. Distributed allocation and centralized allocation are the two kinds of mode. Descriptions will be presented below with respect to a communication resource of spectrum by way of an example.

First Embodiment

Distributed Allocation

In the distributed allocation mode, various calculations are done concurrently on respective member base stations of a community. Upon completion of the calculations, all the base stations will be directed to their self-calculated target resources.

For the distributed allocation, each base station within the community is required to store a neighbor relationship table of the community recording neighbor relationships of the base stations within the community, representing whether every two base stations are mutual neighbor base stations.

Upon a topology change of the community, a base station at a location of the change can directly acquire information on the change and the time when the community topology changed and then broadcast a message to other base stations through a wired network. Alternatively, the base station at the location of the change can broadcast a message about the change and the time when the community topology changed to its neighbor base stations, which can in turn broadcast the message to their neighbor base stations. In this way, the broadcast will proceed in a level-by-level way. If a base station has already received such a message, then the base station will not broadcast the message. In this way, all the base stations can know the change and the time at which the change occurs.

The base station at the location of the change of the community may include: a newly added base station within the community, a neighbor base station of the newly added base station, a base station to be powered off, a neighbor base station of the base station to be powered off, a base station with a voluntary change of its resource configuration, a neighbor base station of the base station with a voluntary change of its resource configuration, a base station with a change of its coverage area and its neighbor base station, a newly neighbor station due to a terminal being newly initiated within the community. When an active terminal in a coverage area of such a base station detects the message transmitted from another base station, the terminal can report interference information to the base station to which it belongs, and thus the base station can know the change of the community, collect and then integrate neighbor relationship tables from its neighbor base stations into an updated neighbor relationship table, and transmit the updated neighbor relationship table to the other base stations through a direct or level-by-level broadcasting way.

Figure 5:
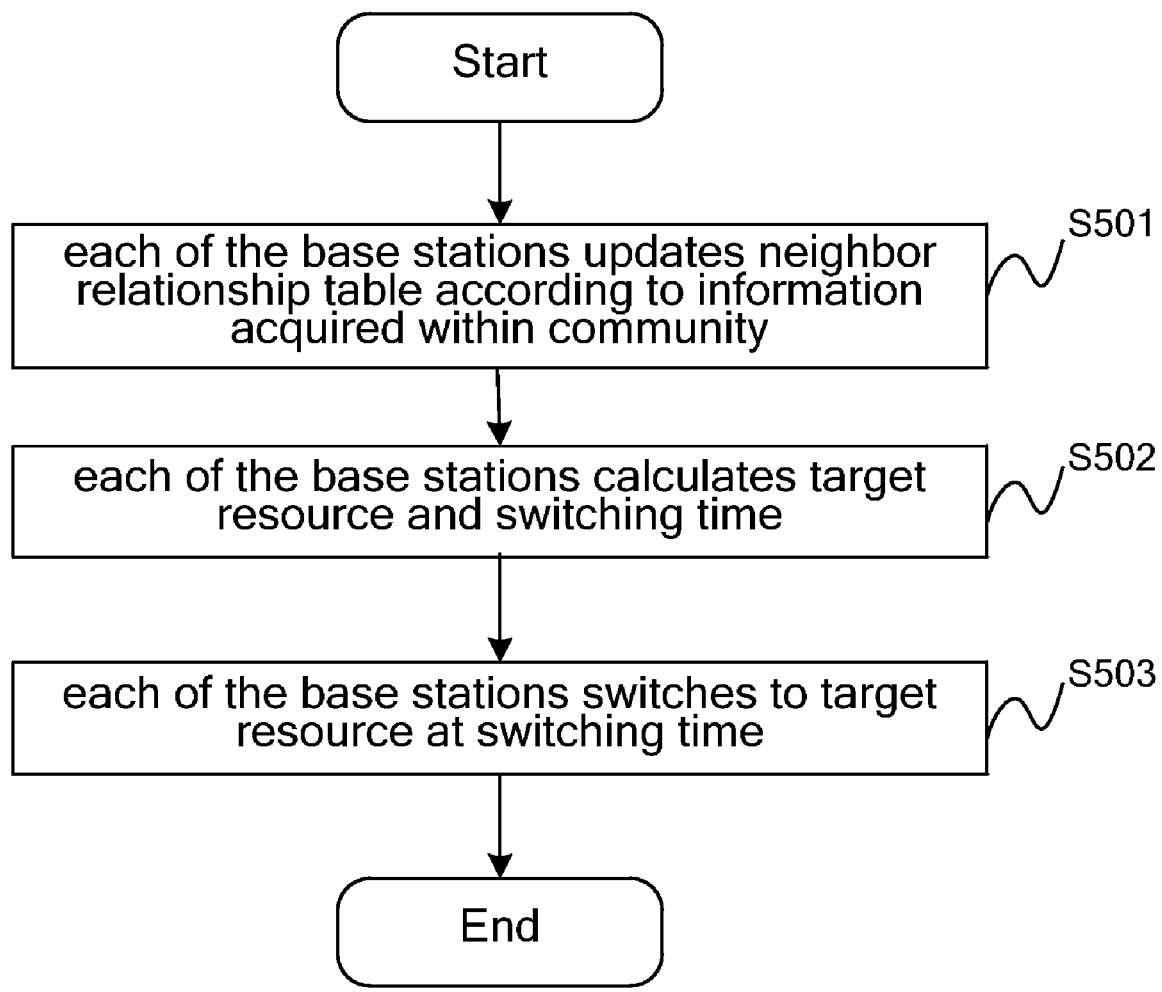
FIG. 5 is a flow chart of each base station calculating and switching a target resource automatically in a distributed allocation mode according to the present disclosure.

Referring to FIG. 5, in a distributed mode, base stations are pear to pear, and operate identically. As an example, one circle of resource reallocation procedure may include the followings.

In S501, each base station updates neighbor relationship table according to an acquired message on a change of a community, and the updated neighbor relationship table of each base station is still identical.

In S502, upon completion of the update, each base station within the community performs a calculation from the updated neighbor relationship table according to a uniform calculation criterion, so as to obtain a target resource for the base station to switch to and a switching time.

Here, the uniform calculation criterion shall be chosen as an optimal resource saving algorithm, such as a greedy algorithm, so as to ensure that a minimized amount of a resource can be used to satisfy the same demand. After each of the base stations finishes the calculation, a new scheme of resource allocation within the entire community can thus be established.

Each base station also performs by itself a calculation of a resource switching time, and the time can be calculated using a same formula, which may be easy to implement because the base stations within the community operate synchronously.

For instance, when informing of each updated neighbor relationship table of the community, a frame serial-number upon a change of the topology of the community can be transmitted along with an update message to each of the base stations. Thus, each base station can introduce a delay relative to the frame serial-number by a same number of frame periods, so that concurrent switching can be achieved. However, the number of frame periods for the delay shall ensure that even the slowest base station will have already finished the calculation of a target resource.

In S503, all of the base stations switch to their target resources at the switching time.

Figure 6:
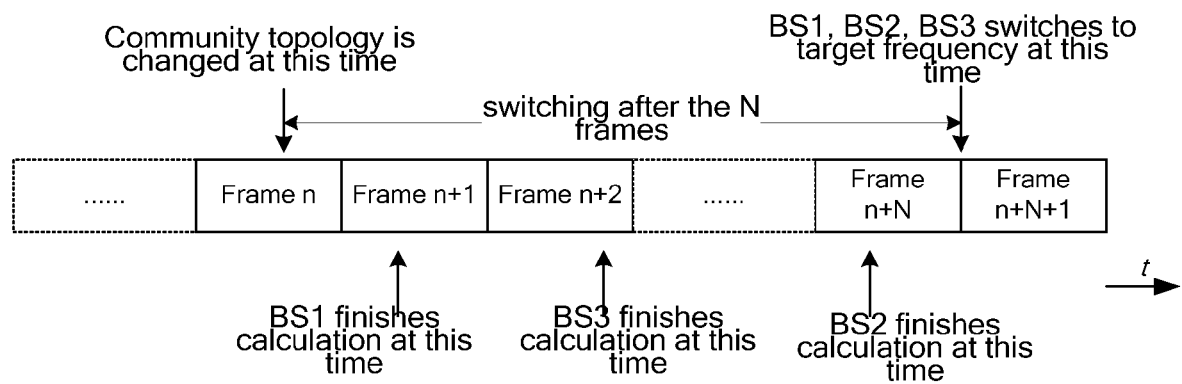
FIG. 6 is a schematic diagram showing that each base station determines a uniform switching time dependent upon corresponding frame serial-numbers in the case that a structure of a community is changed, in the distributed allocation mode according to the present disclosure.

Referring to FIG. 6, there are three base stations, BS1, BS2, and BS3, within a community. Each of the base station is informed of that a topology of the community has changed at a time of a frame serial-number n. Assume that each base station performs a switching after a delay of N frames. Thus the three base stations can perform the switching to respective target resources at the $(n+N+1)^{th}$ frame provided that they finish the calculations of target resources within N frame periods. Particularly, when a new base station joins, the new base station can synchronize a local frame serial-number to a frame serial-number of its neighbor base station.

At the time of switching, each base station switches to its target resource, and releases its originally occupied resource. After all the base stations finish switching to their target resources, the update operation procedure for the community ends, and thus each of the base stations operates normally.

Second Embodiment

Centralized Allocation

In a centralized allocation mode, one base station or server stores and maintains a neighbor relationship table of a community. In the following paragraphs, this base station or server will be referred to as a primary station, and other base stations will be referred to as salve stations, for convenience of descriptions. By way of an example without limitation, a base station first starting up within the community serves as a primary station or a base station in the neighbor relationship table with a largest number of neighbor base stations serves as a primary station, and other base stations serve as slave stations. The neighbor relationship table records neighbor relationships within the community, showing whether every two base stations are mutually neighbor base stations.

Figure 7:
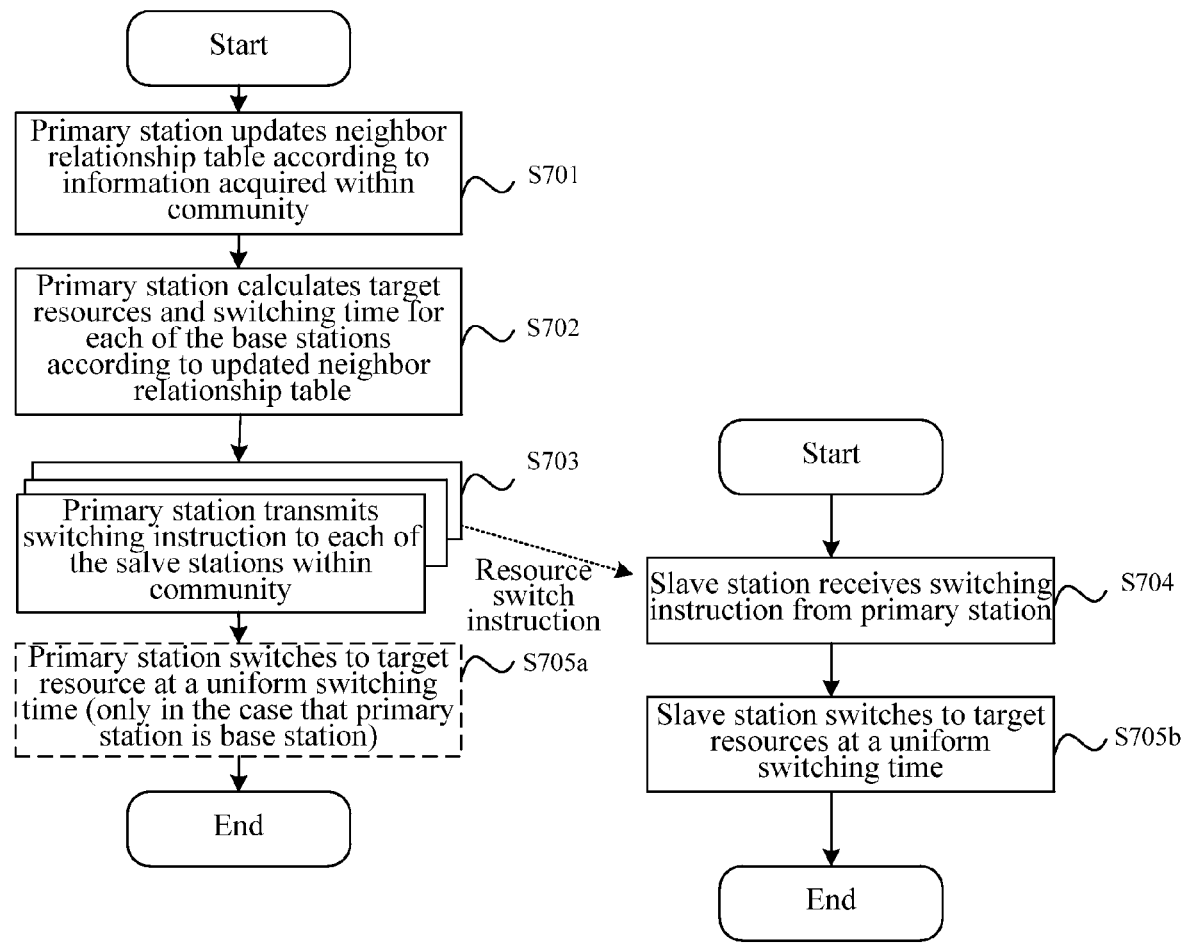
FIG. 7 is a flow chart showing that a primary station calculates a target resource and instructs a slave station to perform synchronous switch in a centralized allocation mode according to the present disclosure.

Referring to FIG. 7, by way of an example, a circle of a resource allocation procedure in which a primary station is a base station within a community may include the following.

In S701, a primary station updates a neighbor relationship table according to information acquired within a community.

Firstly, when a topology of the community is changed, and a new community is generated, the primary station is required to acquire the change. Upon the change of the community, a base station at a location of the change can always acquire the change directly, and if the base station is just a slave station, then the base station can report the change and a change time to a primary station. Thereby the primary station can acquire the change and the time at which the change occurs, and accordingly update the neighbor relationship table, which is not necessary to be performed by the slave station.

In S702, the primary station calculates target resources and a uniform switching time for respective base stations (the primary station and the slave stations) according to the updated neighbor relationship table.

Thereafter, the primary station re-calculates a scheme of resource allocation within the community according to the updated neighbor relationship table. Similarly, a greedy algorithm can also be used. A calculation result is how to use a minimized amount of the resource for allocation within the community. The calculation result always achieves an optimal result, and achieves an arrangement of allocation of the resource which can save the resource to the most extent. Unlike the distributed mode, it is not necessary for the slave stations to perform the calculation.

In S703, the primary station transmits switching instructions to each of the slave base stations within the community.

Upon completion of the calculation of target resources for all the base stations within the community, the primary station is required to instruct the salve stations to perform switching to their respective target resources. A switching instruction mainly includes the following:

1. target resource ID: the target resource ID is an identifier of a target resource to which a slave station switches;

2. switching time: the switching time can be indicated with a frame serial-number, and is a starting time of switching to be performed by a slave station, at which all the base stations within the community perform switching.

The switching time can be a frame serial-number upon a change of the community delayed by a certain number of frame periods, or a frame serial-number at the transmission time of the switching instruction delayed by a certain number of frame periods. Consequently, the primary station can send a frame serial-number upon a change of the community or a frame serial-number at the transmission time of a switching instruction to each of the base stations, and each of the base station can in turn switch the resources after a delay of a preset number of frame periods relative to the received frame serial-number.

In S704, the slave station receives the switching instruction from the primary station.

In S705a and S705b, the primary station and the slave station respectively switch to respective target resources at the uniform switching time.

If the primary station is not a base station, then a target resource will not be allocated for the primary station in the step S702 wherein the primary station is taken as a base station, and accordingly, the step S705a is omitted.

After all the base stations finish switching to their target resources, the update operation procedure for the community ends, and the base stations operate normally.

Third Embodiment

Hybrid Allocation

A hybrid allocation mode is a combination of the two modes of distributed allocation and centralized allocation. Firstly a base station or server stores and maintains a neighbor relationship table of a community, and then each of the base stations calculates its own target resource. Upon completion of the calculation, each of the base station switches to the respective target resource. Hereinafter, such a base station or server will be referred to as a primary station, and other base stations will be referred to as salve stations, for convenience of description. By way of an example without limitation, a base station first starting up within the community serves as a primary station or a base station in the neighbor relationship table with a largest number of neighbor base stations serve as a primary station, and other base stations serve as slave stations. The neighbor relationship table records neighbor relationships within the community, showing whether every two base stations are mutually neighbor base stations.

Figure 8:
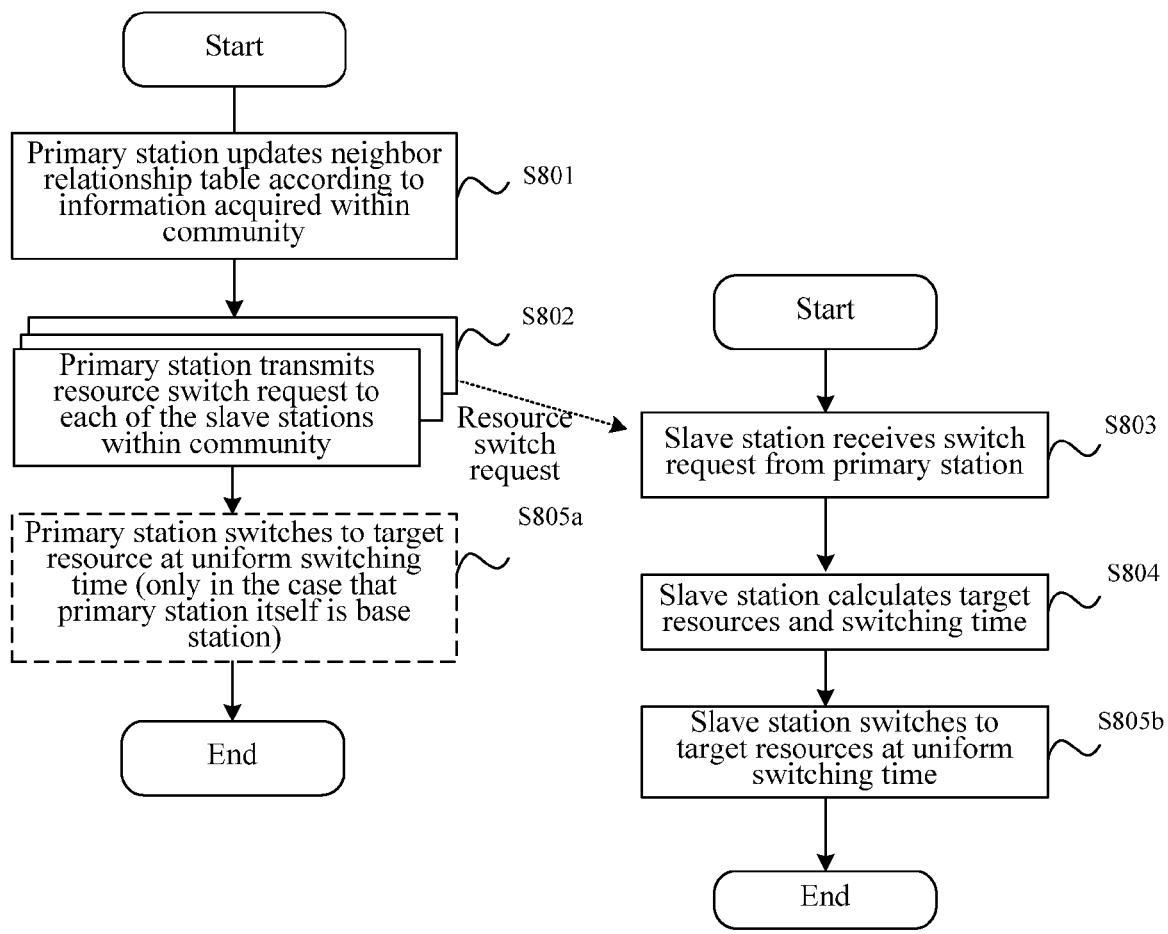
FIG. 8 is a flow chart showing that a primary station requests a slave station to calculate a target resource and to perform synchronous switch in a hybrid allocation mode according to the present disclosure.

Referring to FIG. 8, by way of an example, one circle of a resource allocation procedure in which a primary station is a base station within a community may include the following.

In S801, a primary station updates a neighbor relationship table according to information acquired within a community.

Firstly, when a topology of the community is changed, and a new community is generated, the primary station is required to acquire the change. Upon the change of the community, a base station at a location of the change can always acquire the change directly, and if the base station is just a slave station, then the base station can report the change and a change time to the primary station. Thereby the primary station can acquire the change and the time at which the change occurs, and accordingly update the neighbor relationship table, which is not necessary to be performed by the slave stations.

In S802, the primary station transmits a resource switch request to each of the salve stations within the community.

In transmission of a resource switch request to each of the base stations within the community, the primary station needs to instruct each of the slave stations to switch to respective target resources. A switching instruction mainly includes the following:

1. Updated neighbor relationship table;

2. Switching time: the switching time can be indicated with a frame serial-number, is a starting time of switching to be performed by a slave station, at which all the base stations within the community perform switching.

The switching time can be a frame serial-number upon a change of the community delayed by a certain number of frame periods, or a frame serial-number at the transmission time of a switching instruction delayed by a certain number of frame periods.

In S803, the slave stations receive the resource switch request from the primary station.

In S804, each of the base stations within the community performs a calculation from the updated neighbor relationship table according to a uniform calculation criterion, and thereby obtains a target resource and a switching time.

Here, the uniform calculation criterion shall be chosen as an optimal resource saving algorithm, such as a greedy algorithm, which can ensure that a minimized amount of resource is used to satisfy the same demand. After each of the base stations finishes the calculation, a new scheme of resource allocation within the entire community can thus be established.

Each base station also performs a calculation of a resource switching time, and the time can be calculated using a same formula, which may be easy to implement because the base stations within the community operate synchronously.

For instance, when informing of each updated neighbor relationship table of the community, a frame serial-number upon a change of the topology of the community can be transmitted along with an update message to each of the base stations. Thus, each base station can introduce a delay relative to the frame serial-number by a same number of frame periods, so that concurrent switching can be achieved. However, the number of frame periods for the delay shall ensure that even the slowest base station will have already finished the calculation of a target resource.

In S805$a$ and S805$b$, the primary station and the slave stations respectively switch to the target resources at the uniform switching time.

If the primary station is not a base station, then a target resource will not be allocated for the primary station as in the step S802 wherein the primary station is taken as a base station, and accordingly, the step S805$a$ is omitted.

As mentioned above, the spectrum is just a most typical resource among various communication resources, and other resources are also exclusive as the spectrum is. When necessary, the other resources shall also be allocated and arranged appropriately within a community so as to use a minimized amount of the resource to satisfy a demand.

Figure 9:
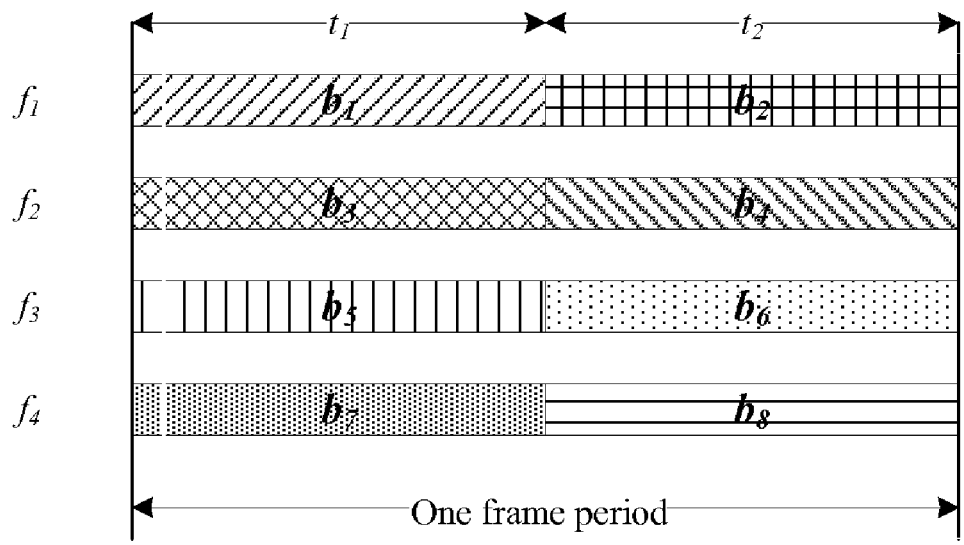
FIG. 9 is a first example of a time-frequency block according to the present disclosure.

The present disclosure integrates a spectrum resource and a time resource into a time-frequency block resource according to a principle of time division multiplexing, which can extend an application of the limited spectrum resource. The time-frequency block refers to a resource consisted of a frequency and a time slot. FIG. 9 illustrates an example of the time-frequency block, and in the figure, there are four available frequencies, $f_1, f_2, \ldots f_4$, and if each frame period is divided into two time slots, $t_1$ and $t_2$, then a resource of eight time-frequency blocks, $b_1, b_2, \ldots b_8$, can be formed.

Figure 10:
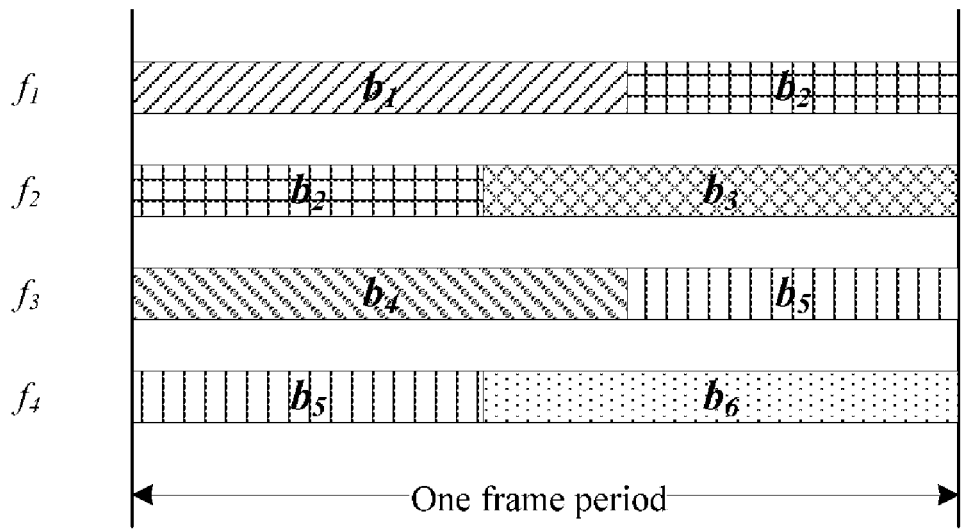
FIG. 10 illustrates a second example of a time-frequency block according to the present disclosure.

Referring to FIG. 10, the time-frequency block division can even be performed in a multi-frequency and multi-period way, if this is allowed. Assume base stations $BS_x$, $BS_y$, occupy respectively the two time-frequency blocks, $b_1$, $b_2$, in the above figure, then $BS_x$ can operate at the frequency, $f_1$, at the first period of time in each frame, and be idle in the last period of time in the frame, while $BS_y$ can operate at the frequency, $f_2$, at the first period of time in each frame, operate at the frequency, $f_1$, at the last period of time in the frame, and be idle in the middle period of time in the frame.

The structure of a community as mentioned in the present disclosure is not limited to coexisting base stations in a wideband access network, and can also be applied to a CDMA (Code Division Multiple Addressing) system, where code words used by respective base stations can be allocated. A code word is a communication resource in the CDMA system, and can be used to differentiate coding of a channel or a user. The CDMA system allows the user to use different code words to share the same spectrum. As a length of a code word varies, a rate provided in a channel as well as desired power will differ. This can be a basic for the CDMA system to support effectively various services and provide different Quality of Service levels. If a method of the present disclosure is applied, automatic allocation of code words can be implemented for respective base stations in the CDMA system upon starting up, and thus optimized allocation of the communication resource can be achieved.

Figure 11:
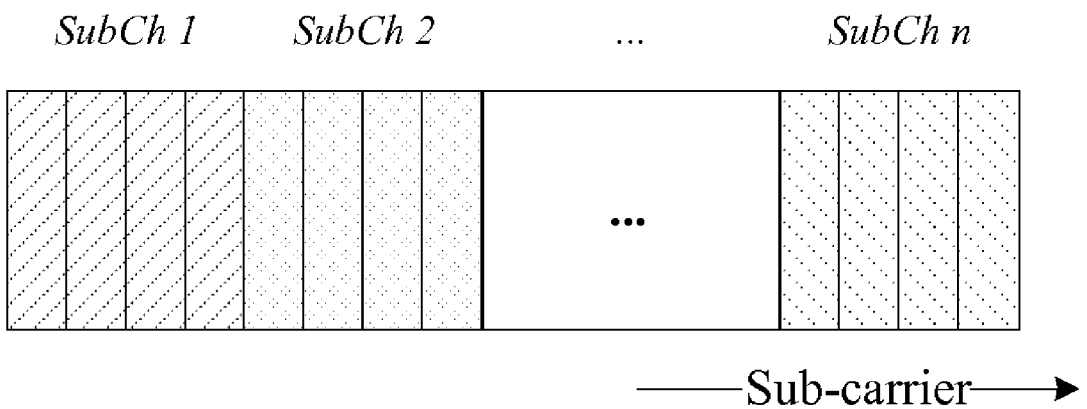
FIG. 11 and FIG. 12 are schematic diagrams of two methods for constituting sub-channels.
Figure 12:
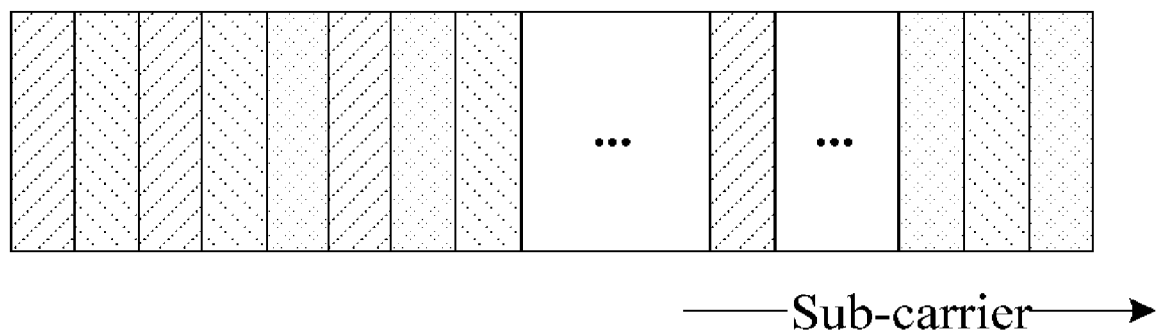

Similarly, the method of the present disclosure can also be applied in an OFDM/OFDMA (Orthogonal Frequency Division Multiple/Orthogonal Frequency Division Multiple Access) system to achieve automatic allocation of sub-channels in the OFDM/OFDMA system. A sub-channel is consisted of a plurality of sub-carriers. In the OFDMA system, the sub-channel can be consisted of a plurality of adjacent and continuous sub-carriers as illustrated in FIG. 11, and also can be consisted of a plurality of sub-carriers scattering throughout the spectrum as illustrated in FIG. 12.

The method of the present disclosure can be applied not only to expansion of a community, but also to reduction of a community, so as to re-optimize resource allocation.

Figure 13:
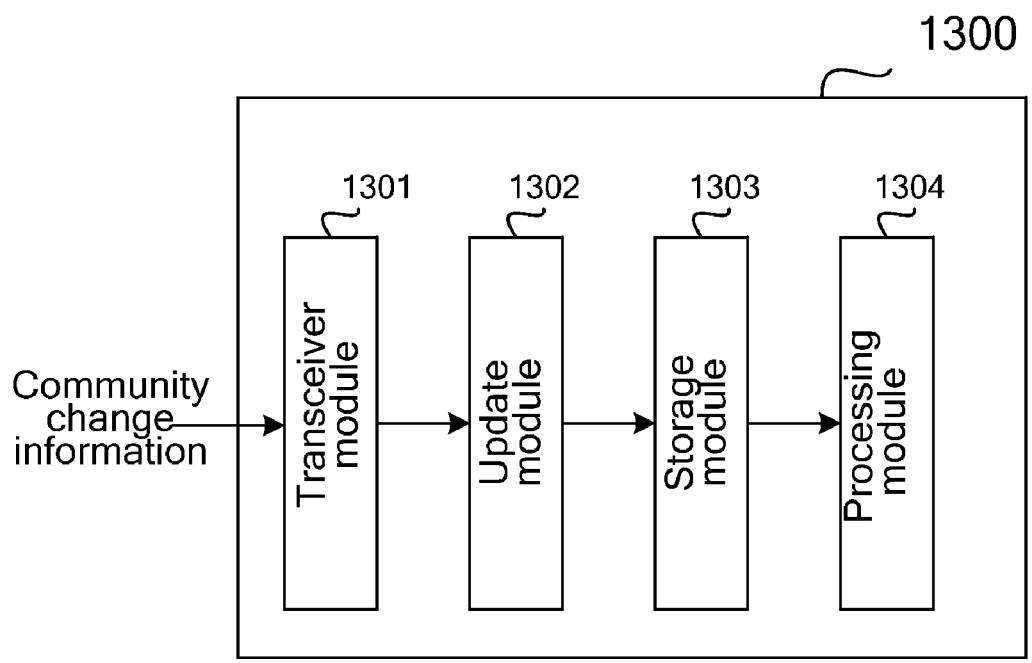
FIG. 13 is a schematic diagram of a general structure of a network device according to the present disclosure.

Referring to FIG. 13, the present disclosure also provides a network device 1300 for implementing the above resource allocation method. This network device 1300 stores therein a neighbor relationship table of a community to which it belongs, and can update the neighbor relationship table according to a change of the community, and then determine a new scheme of resource allocation according to the neighbor relationship table. For this, the network device 1300 includes the following:

a transceiver module 1301, which receives information on a change of the community transmitted from another network entity;

an update module 1302 and a storage module 1303, the update module 1302 connected between the transceiver module 1301 and the storage module 1302, updating the neighbor relationship table stored in the storage module 1303 according to the information on the change of the community received from another network entity and/or perceived by the update module, or updating the received neighbor relationship table of the community into the storage module 1303;

a processing module 1304, connected with the storage module 1303, which reallocates a communication resource and determines a switching time according to the updated neighbor relationship table.

Figure 14:
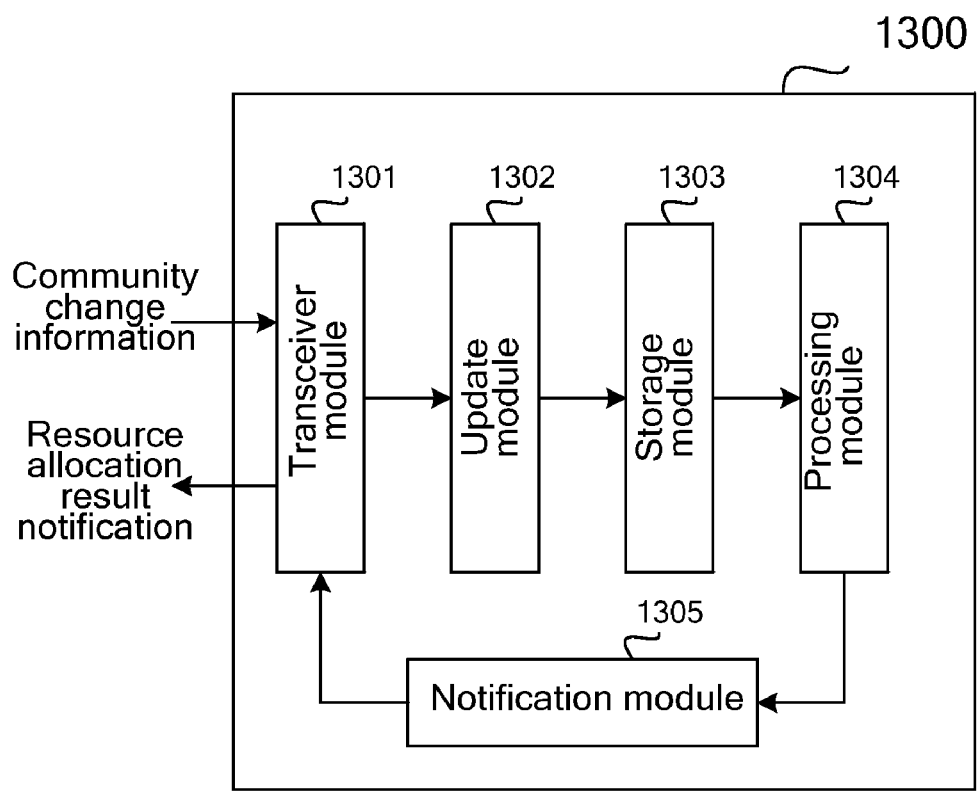
FIG. 14 is a schematic diagram of a general structure of a server as a primary station in a centralized control scheme according to the present disclosure.

Referring to FIG. 14, in the case that the above network device is a server within the community serving as a primary station and performing resource allocation in the centralized or hybrid mode, the server also includes the following in addition to the above:

a notification module 1305, connected between the transceiver module 1301 and the processing module 1304, which generates a notification message including information on a resource allocation result and a switching time, or a notification message including the neighbor relationship table of the community, and transmits the message to the respective base stations within the community through the transceiver module 1301.

Figure 15:
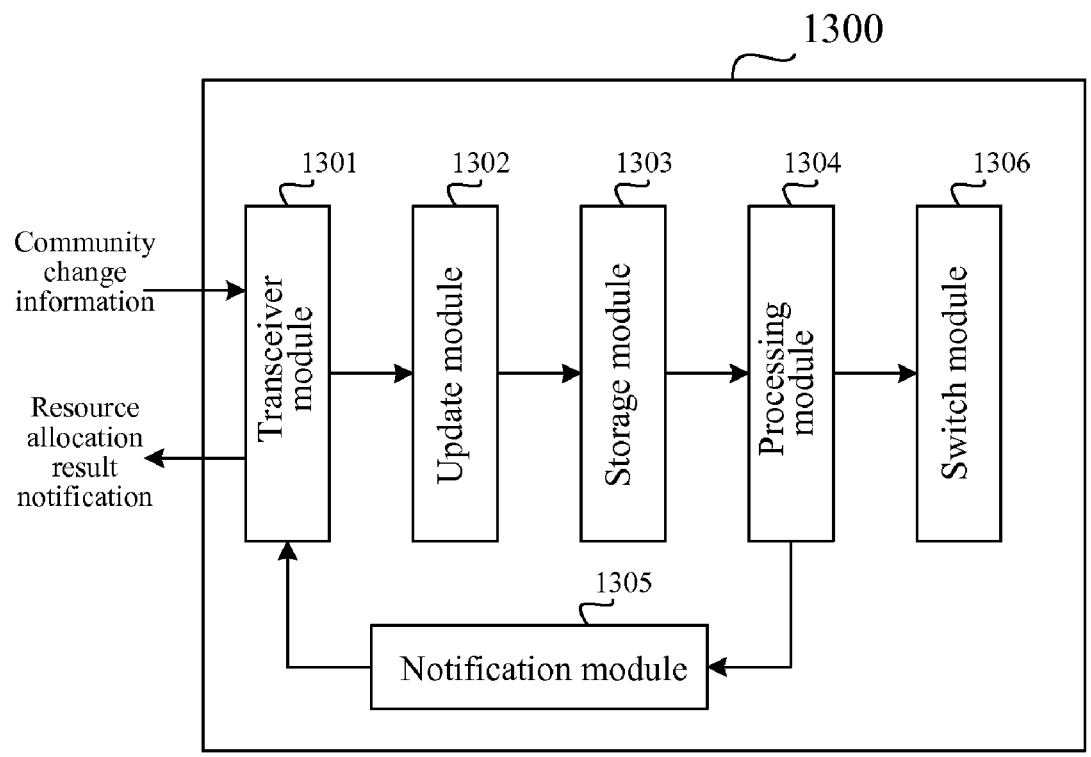
FIG. 15 is a schematic diagram of a general structure of a base station as a primary station in a centralized control scheme according to the present disclosure.

Referring to FIG. 15, in the case that functions of the server are hosted by a base station, the base station also includes the following in addition to those illustrated in FIG. 14:

a switch module 1306, connected with the processing module 1304, which switches the present base station to a corresponding target resource at the switching time.

Figure 16:
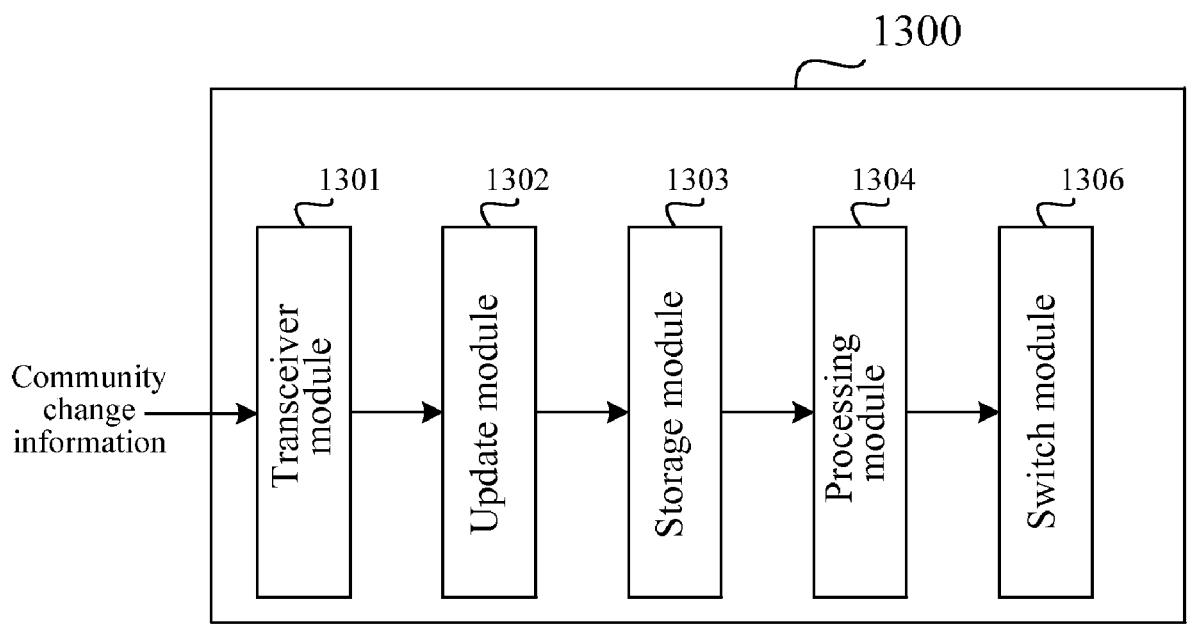
FIG. 16 is a schematic diagram of a general structure of a base station in a distributed control scheme according to the present disclosure.

Referring to FIG. 16, in the distributed control mode, each base station within the community also includes the switch module 1306, connected with the processing module 1304. The switch module 1306 switches the present base station to a corresponding target resource at the switching time.

The method of the present disclosure can make use of various optimization algorithms. The common greedy algorithm is used to describe how to allocate a frequency hereinafter by way of an example. For clarity, a background color indicates a frequency, and different background colors represent different frequencies. If a base station is regarded as a node, then a procedure of selecting frequency for each base station within a community is a procedure of coloring each node. Further, a neighbor relationship table indicates neighbor relationships between the respective nodes. Every two adjacent nodes are connected with a line, thus forming a topology diagram of the nodes. The problem of automatic selection of frequency for the base stations within the community is equivalent to the well-known Coloring Problem.

Figure 17:
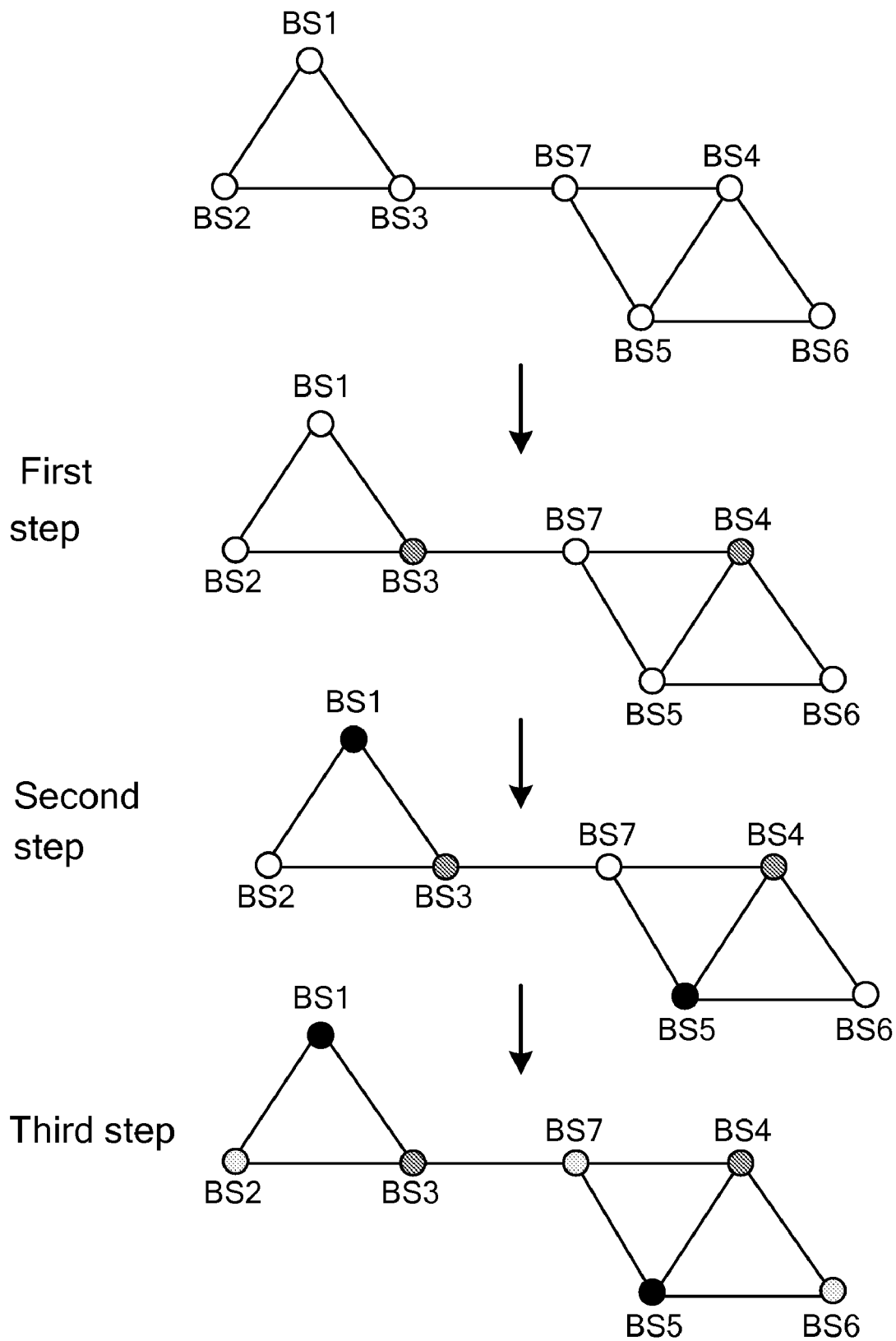
FIG. 17 is a schematic diagram of calculation steps of a greedy algorithm.

Still with the above diagram used for the descriptions of different arrangements of frequency allocation leading to different results, a topology of a generated new community can be abstracted as a topology of nodes as illustrated in FIG. 17. The neighbor relationship table corresponding to the community is illustrated in Table 2, wherein the base station is in a descending order of the numbers of neighbor base stations.

TABLE 2

Neighbor Relationship Table

| Base Station ID | BS3 | BS4 | BS5 | BS7 | BS1 | BS2 | BS6 |
|---|---|---|---|---|---|---|---|
| BS3 | 1 | 0 | 0 | 1 | 1 | 1 | 0 |
| BS4 | 0 | 1 | 1 | 1 | 0 | 0 | 1 |
| BS5 | 0 | 1 | 1 | 1 | 0 | 0 | 1 |
| BS7 | 1 | 1 | 1 | 1 | 0 | 0 | 0 |
| BS1 | 1 | 0 | 0 | 0 | 1 | 1 | 0 |
| BS2 | 1 | 0 | 0 | 0 | 1 | 1 | 0 |
| BS6 | 0 | 1 | 1 | 0 | 0 | 0 | 1 |

Currently, the greedy algorithm is one of practical algorithms for solving the Coloring Problem, and a coloring procedure executed as per the greedy algorithm can be explained by the following:

```
Initialize: G = [a set of all nodes]
Repeat: while (G is not empty)
    {
    Select a new background color as a current background
color C;
    Coloring with the color C as many uncolored nodes which
are not connected to nodes with the color C as possible;
    Remove the colored nodes from G.
    }
```

In this example, as shown in a first step in the FIG. 17, assume that a dark-gray color is used firstly, and starting from a first row of the neighbor relationship table, BS3 is colored with dark gray, then BS4 can also be colored with dark gray, and remaining nodes are connected to either BS3 or BS4.

Referring to a second step in FIG. 17, a new background color is used, e.g., black, and BS5, BS7, BS1, BS2, and BS6 remain uncolored. Firstly BS5 is colored with black, then BS1 can also be colored with black, and the remaining nodes are connected to either BS5 or BS1.

Referring to a third step in FIG. 17, another new background color is used, e.g., light grey, and BS7, BS2, and BS6 remain uncolored. Firstly BS7 is colored with light grey, and because BS2 and BS7 are not connected with a line, BS2 can also be colored with light grey. BS6 is neither connected to BS7 with a line, nor connected to BS2 with a line, and therefore BS6 can also be colored with light grey.

To this end, all the nodes have been colored, and only three background colors have been used. This is an allocation method using only three frequencies to achieve interference-free coexistence within the community.

Obviously, those skilled in the art can make various modifications and variations to the present disclosure without departing from the spirit and scope thereof. Accordingly, it is intended that the present disclosure includes all the modifications and variations provided these modifications and variations fall within the claims and the equivalents thereof.

What is claimed is:

1. A method for allocating a communication resource within a community comprising at least two base stations, comprising:
   updating a neighbor relationship table of the community when a community topology is changed;
   reallocating target communication resource used by each of the base stations according to the updated neighbor relationship table;
   switching respectively, by each of the base stations within the community, communication resource to the reallocated communication resource at a same switching time;
   updating, by one of the base stations within the community or a server of the community, the neighbor relationship table of the community when the community topology is changed, and transmitting the updated neighbor relationship table to each of the base stations within the community; and
   using, by each of the base stations within the community, a same algorithm to reallocate respective target communication resource according to the updated neighbor relationship table.

2. The method according to claim 1, comprising,
   updating, by one of the base stations within the community or a server of the community, the neighbor relationship table of the community when the community topology is changed, and reallocating the target communication resource for each of the base stations within the community according to the updated neighbor relationship table; and
   informing, by the server of the community or the base station which performs resource reallocation, each of the base stations within the community of an allocation result.

3. The method according to claim 1, further comprising:
   transmitting, by the one of the base stations within the community or the server of the community, information on transmission time to each of the base stations simultaneously with the transmission of the neighbor relationship table or the allocation result of the target communication resource, and determining, by each of the base stations, the same switching time from the information on transmission time.

4. The method according to claim 3, wherein the information on transmission time is a frame serial-number at the transmission time, and the same switching time is a time of the frame serial-number delayed by a preset number of frame periods.

5. The method according to claim 1, wherein the server of the community, which updates the neighbor relationship table of the community when the community topology is changed, updates the neighbor relationship table of the community according to information reported by a base station at a location of the change of the community.

6. The method according to claim 5, wherein, the base station at a location of the change of the community also reports time information on the change of the community, and the server of the community records the time information on the change of the community.

7. The method according to claim 1, wherein the base station, which updates the neighbor relationship table of the community when the community topology is changed, is a base station at a location of the change of the community.

8. The method according to claim 7, wherein the base station at the location of the change of the community updates a local neighbor relationship table according to a neighbor relationship table of a neighbor base station, and records time information on the change of the community.

9. The method according to claim 6, wherein acquiring, by each of the base stations within the community, the updated neighbor relationship table of the community and the time information on the change of the community comprises the steps of:

updating, by the server of the community or the base station at a location of the change of the community, the neighbor relationship table of the community and the time information on the change of the community, and then transmitting the updated neighbor relationship table of the community and the time information on the change of the community to other base stations within the community; and updating, by the other base stations within the community, their neighbor relationship tables of the community according to the received neighbor relationship table, and storing the time information on the change of the community; or updating, by the server of the community or the base station at a location of the change of the community, the neighbor relationship table of the community and the time information on the change of the community, and then transmitting the updated neighbor relationship table of the community and time information on the change of the community to a neighbor base station; and broadcasting, by the neighbor base station, in a level-by-level way, the updated neighbor relationship table of the community and time information on the change of the community to all the base stations within the community dependent upon neighbor relationships.

10. The method according to claim 9, wherein the time information on the change of the community is a frame serial-number within the community or an absolute time synchronized within the community.

11. The method according to claim 10, wherein each of the base stations within the community introduces a delay of a preset threshold to the time information on the change of the community to obtain the adjust time.

12. The method according to claim 11, wherein the preset threshold is a number of frames within the community or an absolute time span.

13. The method according to claim 6, wherein the base station at the location of the change of the community at least comprises: a newly added base station within the community, a neighbor base station of the newly added base station, a base station to be powered off, a neighbor base station of the base station to be powered off, a base station with a voluntary change of resource configuration, a neighbor base station of the base station with a voluntary change of resource configuration, a base station with a coverage area change and its neighbor base station, a newly neighbor station due to a terminal being newly initiated within the community.

14. The method according to claim 13, wherein when a base station is added newly within the community, the method further comprises: synchronizing, by the newly added base station, upon joining the community, frame timing and the frame serial-number to a neighbor base station.

15. The method according to claim 1, wherein:

the communication resource comprises a frequency, a time, a code word in a CDMA system, or a sub-channel in an OFDM/OFDMA system, used by each of the base stations; and/or an algorithm for communication resource reallocation comprises a greedy algorithm.

16. A network device comprising a transceiver module, wherein:

the network device further comprises an update module, a storage module, a processing module, and a notification module;

the update module is connected between the transceiver module and the storage module, and updates a neighbor relationship table stored in the storage module according to information on a change of a community received from another network entity and/or perceived by the update module, or updates a received neighbor relationship table of the community into the storage module;

the processing module is connected with the storage module and reallocates a communication resource and determines a switching time according to the updated neighbor relationship table; and the notification module is connected between the transceiver module and the processing module, generates a notification message comprising information on a resource allocation result and a switching time, or a notification message comprising the neighbor relationship table of the community, and transmits the notification message to other network devices within the community through the transceiver module.

17. The network device according to claim 16, further comprising:

a switch module connected with the processing module, the switch module switching the network device to a corresponding target resource at a switching time.

\* \* \* \* \*